US009120042B2

(12) United States Patent
Biswas et al.

(10) Patent No.: US 9,120,042 B2
(45) Date of Patent: Sep. 1, 2015

(54) COMPACT FILTER ASSEMBLY FOR REMOVING OIL MIST AND ODOR FROM AN AIRSTREAM

(71) Applicant: AMERICAN STERILIZER COMPANY, Mentor, OH (US)

(72) Inventors: Prantik Guha Biswas, Mentor, OH (US); Peter J. Buczynski, Girard, PA (US); Kenneth J. Klobusnik, Lake City, PA (US)

(73) Assignee: American Sterilizer Company, Mentor, OH (US)

( * ) Notice: Subject to any disclaimer, the term of this patent is extended or adjusted under 35 U.S.C. 154(b) by 0 days.

(21) Appl. No.: 14/014,874

(22) Filed: Aug. 30, 2013

(65) Prior Publication Data

US 2015/0059300 A1  Mar. 5, 2015

(51) Int. Cl.
*B01D 46/00* (2006.01)
*B01D 46/24* (2006.01)

(52) U.S. Cl.
CPC ........ *B01D 46/0024* (2013.01); *B01D 46/0031* (2013.01); *B01D 46/0038* (2013.01); *B01D 46/2411* (2013.01)

(58) Field of Classification Search
CPC ....... B01D 24/008; B01D 50/00; B01D 46/26
USPC .................... 55/355, 482, 485, 486
See application file for complete search history.

(56) References Cited

U.S. PATENT DOCUMENTS

| 456,464 | A | * | 7/1891 | Bauer | 96/322 |
|---|---|---|---|---|---|
| 1,714,825 | A | * | 5/1929 | Stephan | 55/419 |
| 2,521,785 | A | * | 9/1950 | Minor | 55/482 |
| 2,710,666 | A | * | 6/1955 | May | 96/406 |
| 2,863,563 | A | * | 12/1958 | Ellis et al. | 210/496 |
| 3,708,965 | A | * | 1/1973 | Domnick | 55/488 |
| 3,772,857 | A | * | 11/1973 | Jackson et al. | 55/418 |
| 4,189,310 | A | * | 2/1980 | Hotta | 55/317 |

(Continued)

FOREIGN PATENT DOCUMENTS

JP   2010-247135   11/2010   ............. B01D 39/06

OTHER PUBLICATIONS miniValve, "Umbrella Valves, Belleville Valves, How They Work!", Dec. 28, 2011, All Pages https://web.archive.org/web/20111228011809/http://www.minivalve.com/newsite/index.php/en/by-type/belleville-valves/how-they-work.*

(Continued)

*Primary Examiner* — Amber Orlando
*Assistant Examiner* — Britanny Precht
(74) *Attorney, Agent, or Firm* — Kusner & Jaffe

(57) ABSTRACT

A device for removing oil mist and odors from an airstream comprising a base having an air inlet in the lower end thereof for receiving an airstream. A first tubular filter has a first end and a second end. The first end is closed, and the second end is mounted on the base wherein the first tubular filter defines an inner chamber that is in communication with the air inlet. A second tubular filter is mounted on the base. The second tubular filter surrounds the first tubular filter and defines an outer chamber therebetween. An opening is formed through the base. The opening connects the outer chamber with the air inlet. A valve element is disposed in the base. The valve element allows flow from the outer chamber to the air inlet when pressure in the outer chamber exceeds pressure in the air inlet.

9 Claims, 5 Drawing Sheets

(56) References Cited

U.S. PATENT DOCUMENTS

| | | | |
|---|---|---|---|
| 4,203,739 A * | 5/1980 | Erdmannsdorfer | 55/323 |
| 4,231,768 A * | 11/1980 | Seibert et al. | 96/128 |
| 4,265,647 A * | 5/1981 | Donachiue | 55/315 |
| 4,331,460 A * | 5/1982 | Dillmann et al. | 55/485 |
| 4,500,332 A * | 2/1985 | Gillingham | 55/443 |
| 4,995,974 A * | 2/1991 | Lorey et al. | 210/247 |
| 5,141,714 A * | 8/1992 | Obuchi et al. | 422/174 |
| 5,702,602 A * | 12/1997 | Brown et al. | 210/342 |
| 5,738,785 A * | 4/1998 | Brown et al. | 210/232 |
| 5,753,117 A * | 5/1998 | Jiang | 210/232 |
| 6,309,436 B1 | 10/2001 | Holch | 55/337 |
| 7,361,271 B2 * | 4/2008 | Merritt et al. | 210/323.2 |
| 7,563,299 B2 * | 7/2009 | Baptista da Costa et al. | 55/488 |
| 7,909,921 B1 * | 3/2011 | Gilbert | 96/224 |
| 8,388,713 B2 * | 3/2013 | Enderich et al. | 55/313 |
| 2002/0083691 A1 * | 7/2002 | Chang | 55/385.1 |
| 2003/0217640 A1 * | 11/2003 | Alper | 95/90 |
| 2006/0143853 A1 * | 7/2006 | Agerlid et al. | 15/353 |
| 2007/0125698 A1 * | 6/2007 | Merritt et al. | 210/450 |
| 2007/0137156 A1 * | 6/2007 | da Costa et al. | 55/486 |
| 2007/0209983 A1 | 9/2007 | Johnson et al. | 210/132 |
| 2009/0019823 A1 * | 1/2009 | Juliar et al. | 55/472 |
| 2009/0050121 A1 * | 2/2009 | Holzmann et al. | 123/573 |
| 2011/0036242 A1 * | 2/2011 | Enderich et al. | 96/400 |
| 2012/0124950 A1 | 5/2012 | Sessions et al. | 55/482 |
| 2012/0144789 A1 * | 6/2012 | Schnacke | 55/482 |
| 2013/0087497 A1 * | 4/2013 | Wells et al. | 210/435 |
| 2014/0033926 A1 * | 2/2014 | Fassel et al. | 96/397 |
| 2014/0208703 A1 * | 7/2014 | Willems et al. | 55/423 |
| 2014/0245977 A1 * | 9/2014 | Krystufek et al. | 123/41.86 |

OTHER PUBLICATIONS

Search Report received in the corresponding International Application No. PCT/US14/45546, dated Oct. 15/2014.

* cited by examiner

COMPACT FILTER ASSEMBLY FOR REMOVING OIL MIST AND ODOR FROM AN AIRSTREAM

FIELD OF THE INVENTION

The present invention relates generally to an apparatus for removing oil mist and odor from an airstream and, more particularly, to a compact filter assembly for removing oil mist and odor from an airstream. The invention is particularly applicable for use in a low-temperature sterilizer having a vacuum pump therein and will be described with particular reference thereto. It will be understood, however, that the disclosed filter assembly has other applications for removing oil mist in an airstream.

BACKGROUND OF THE INVENTION

Low-temperature sterilizers typically sterilize articles in a chamber under vacuum conditions. A liquid sterilant is injected into the chamber and vaporizes, surrounds, and penetrates the articles to be sterilized with a vaporized sterilant. Such sterilizers include a vacuum pump for drawing vacuum within the chamber. During the operation of the vacuum pump, oil mist and other debris are withdrawn from the chamber and are exhausted from the outlet port of the vacuum chamber. Heretofore, a complex assembly was provided at the outlet port of the vacuum pump to filter oil and other material from an airstream created by the vacuum pump prior to releasing the airstream to the surrounding environment. A separate filter assembly was provided downstream of the oil mist eliminator to remove odors from the exhausted air.

Such assemblies were not only bulky but were also difficult and expensive to assemble and maintain during the life of the sterilizer.

The present invention overcomes these and other problems and provides a filter assembly for removing oil mist and odor from an airstream, more particularly from the exhaust of a vacuum pump used in a low-temperature sterilizer.

SUMMARY OF THE INVENTION

In accordance with a preferred embodiment of the present invention, there is provided a device for removing oil mist and odors from an airstream comprising a base having an air inlet in the lower end thereof for receiving an airstream. A first tubular filter has a first end and a second end. The first end is closed, and the second end is mounted on the base wherein the first tubular filter defines an inner chamber that is in communication with the air inlet. A second tubular filter is mounted on the base. The second tubular filter surrounds the first tubular filter and defines an outer chamber therebetween. An opening is formed through the base. The opening connects the outer chamber with the air inlet. A valve element is disposed in the base. The valve element allows flow from the outer chamber to the air inlet when pressure in the outer chamber exceeds pressure in the air inlet.

An advantage of the present invention is the provision of a filter assembly for removing oil mist and odor from an airstream.

Another advantage of the present invention is a filter assembly as described above that is compact and efficient.

A still further advantage of the present invention is a filter assembly as described above wherein oil removed from the airstream is returned to the vacuum pump.

Another advantage of the present invention is a filter assembly as described above that does not increase resistance to airflow.

A still further advantage of the present invention is a filter assembly as described above that is simple in construction and is easy to assemble and maintain.

A still further advantage of the present invention is a filter assembly as described above that utilizes a valve assembly to return oil collected in a filter back to a device upstream of the filter assembly.

A still further advantage of the present invention is a filter assembly as described above wherein the valve means is comprised of an umbrella valve.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
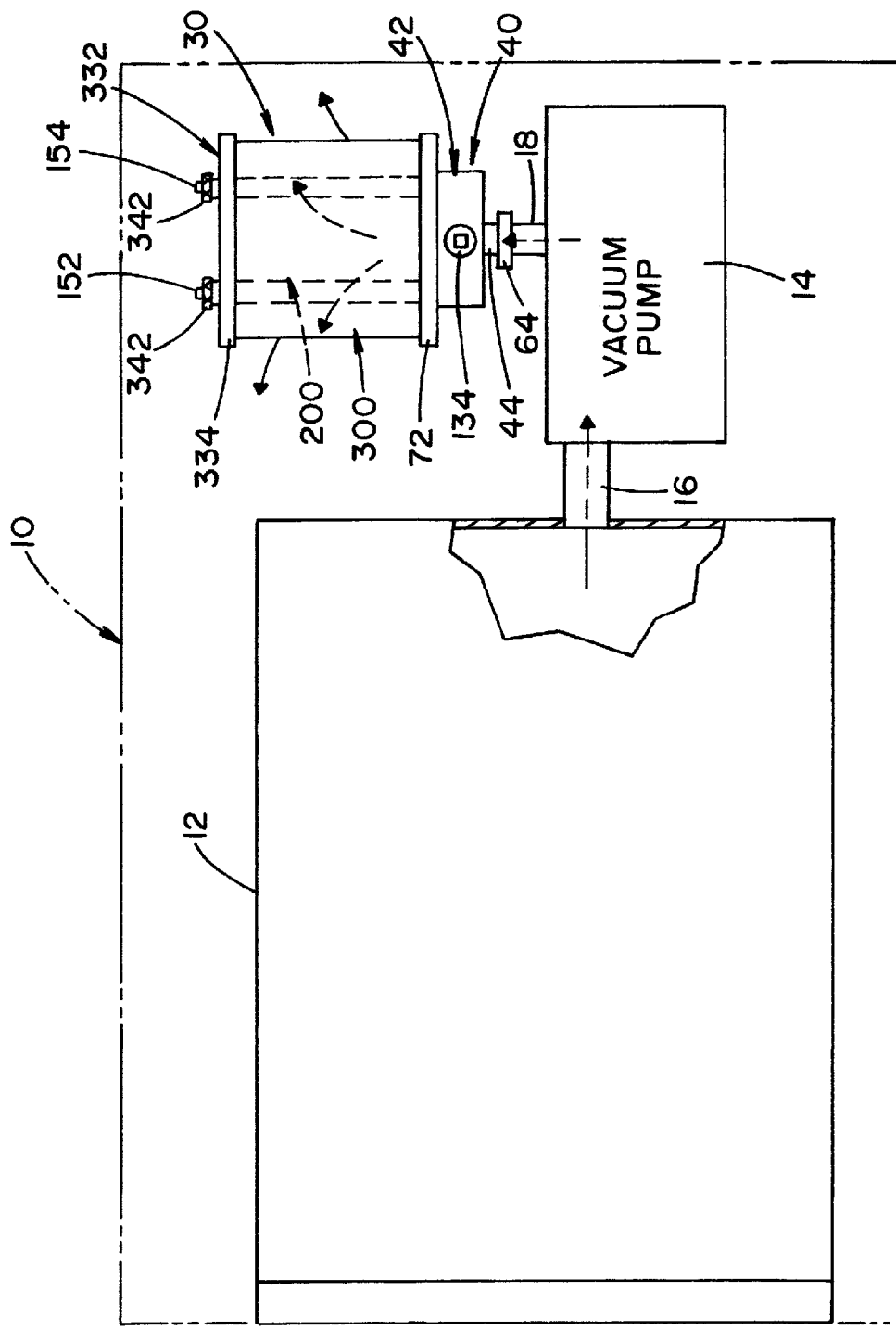
FIG. 1 is a schematic view of a sterilizer, showing a sterilizing chamber connected to a vacuum pump having a filter assembly mounted thereto for removing oil mist and odor in an airstream from the vacuum pump.

Referring now to the drawings wherein the showings are for the purpose of illustrating a preferred embodiment of the invention only and not for the purpose of limiting same, FIG. 1 schematically illustrates a low-temperature sterilizer 10 (shown in phantom) having a sterilization chamber 12 where articles (not shown) are sterilized. Sterilization chamber 12 is connected to a vacuum pump 14 that is operable to create a vacuum within sterilization chamber 12 during a sterilization cycle. An inlet conduit 16 connects sterilization chamber 12 to an inlet of vacuum pump 14. An outlet conduit 18 connects an outlet of vacuum pump 14 to a compact filter assembly 30 for removing oil mist from air evacuated from sterilization chamber 12 during a sterilization cycle.

Figure 2:
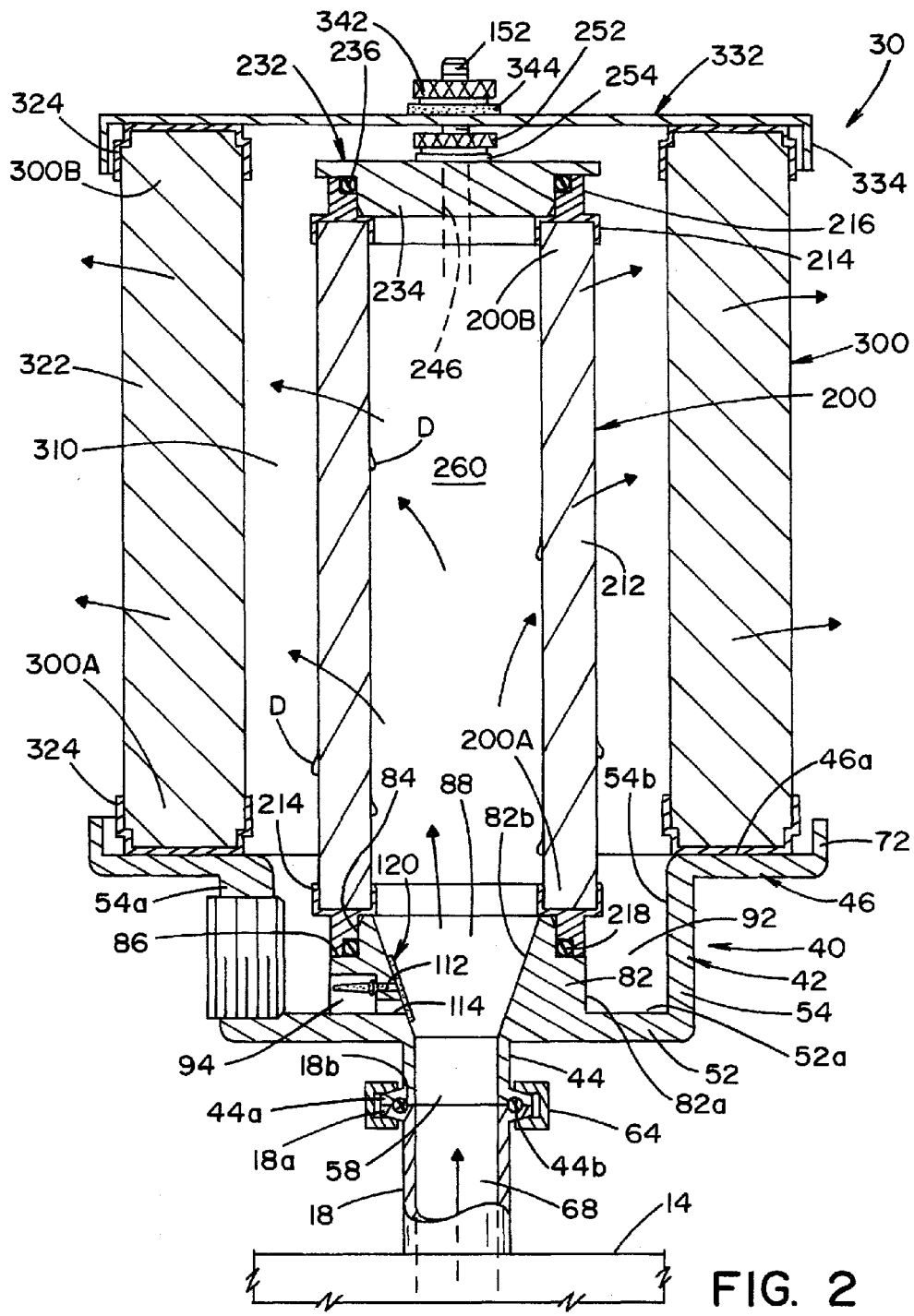
FIG. 2 is a sectional view of the filter assembly shown in FIG. 1, illustrating a preferred embodiment of the present invention.
Figure 4:
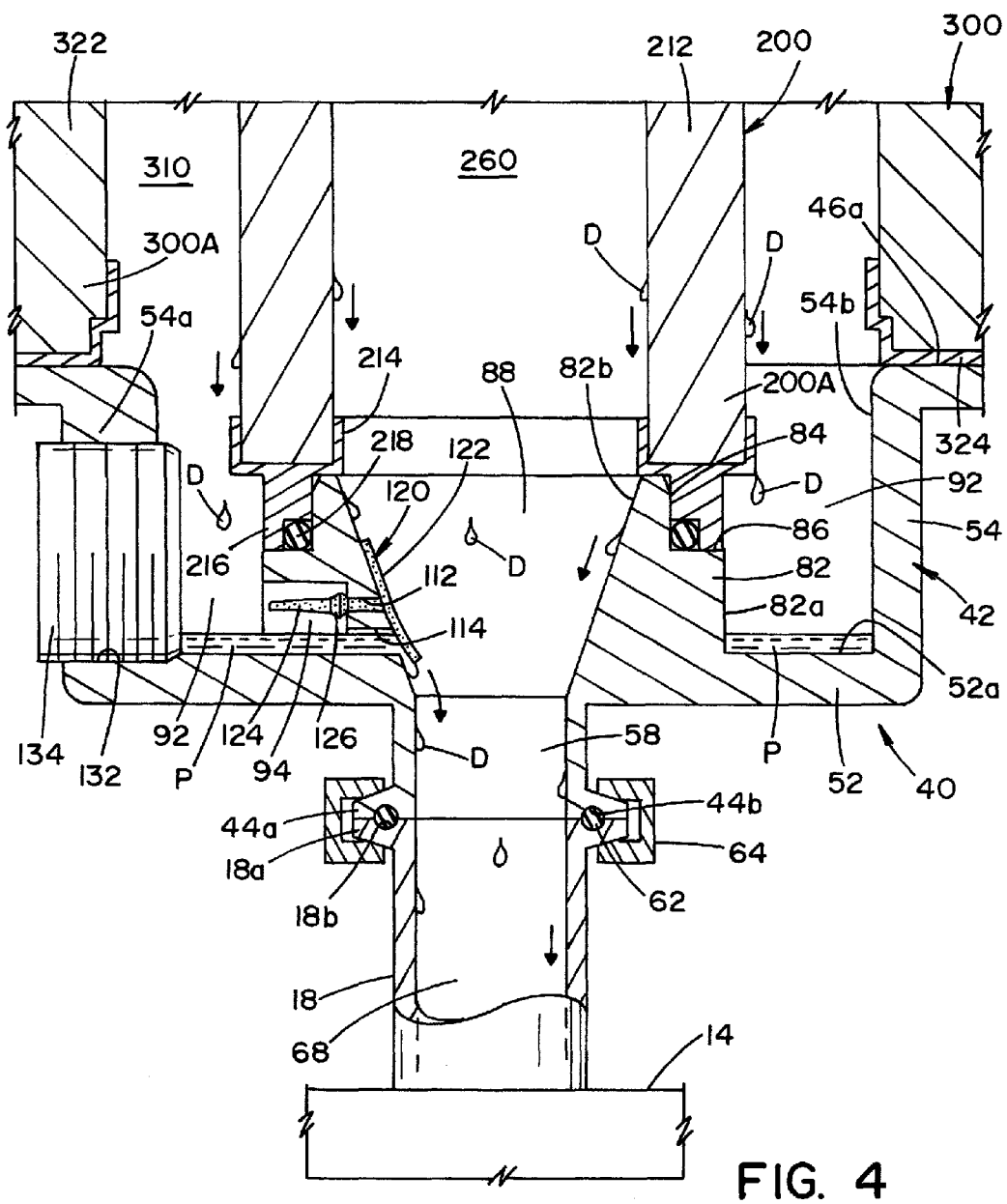
FIG. 4 is an enlarged view of the lower end of the filter assembly, showing how oil collected by the filter assembly is returned to a device upstream of the filter assembly.
Figure 5:
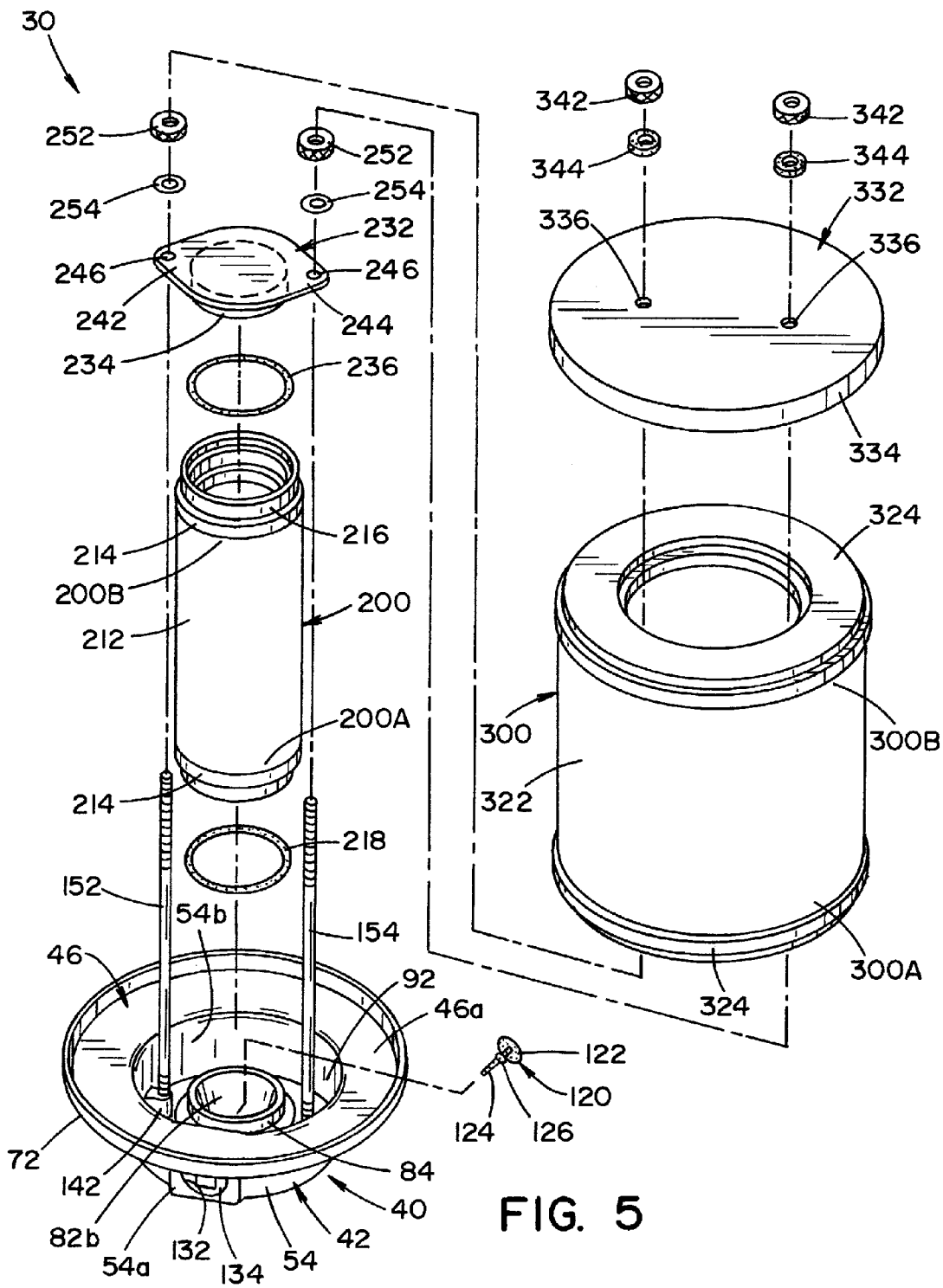
FIG. 5 is an exploded view of the filter assembly.

The free end of outlet conduit 18 includes an outward-extending flange 18a, shown in FIGS. 2 and 4. Filter assembly 30 is basically comprised of an inner filter 200 for removing oil and mist from an airstream created by vacuum pump 14 and an outer filter 300 that surrounds inner filter 200 for removing odors from the airstream created by vacuum pump 14. Inner filter 200 and outer filter 300 are both supported on a base 40.

Base 40 is comprised of a cup-shaped portion 42, a tubular stack portion 44 extending from the underside of cup-shaped portion 42, and a flange portion 46 extending outwardly from the upper edge of cup-shaped portion 42.

Cup-shaped portion 42 of base 40 includes a flat, circular bottom wall 52 and a cylindrical side wall 54 that extends upward from the periphery of bottom wall 52. Side wall 54 includes a section 54a (best seen in FIG. 2) where the thickness of side wall 54 is enlarged.

Stack portion 44 extends downward from the underside, i.e., bottom, of bottom wall 52. In the embodiment shown, tubular stack portion 44 is cylindrical in shape and defines a cylindrical opening or passageway 58 therethrough. The lower, free end of stack portion 44 includes a small outward-extending flange 44a. The outward-extending flange 44a of stack portion 44 is dimensioned to mate with flange 18a on outlet conduit 18 from vacuum pump 14. Flange 44a of stack portion 44 and flange 18a of outlet conduit 18 from vacuum pump 14 each includes an annular groove, designated 44b and 18b respectively, as best seen in FIG. 4. Annular grooves 18b, 44b are dimensioned to be in registry with each other and to receive an O-ring 62 therein. As shown in the drawings, flanges 44a, 18a on stack portion 44 of base 40 and outlet conduit 18 are designed to mate and engage with each other, wherein filter assembly 30 may be attached to outlet conduit 18 by a collar clamp 64 as is conventionally known. As illustrated in the drawings, a passageway 68 through outlet conduit 18 communicates with passageway 58 defined by stack portion 44.

Flange portion 46 of base 40 extends outwardly along the upper edge of cup-shaped portion 42 and includes an upward-extending collar or lip 72 along the outer edge thereof. Flange portion 46 defines a flat annular surface 46a dimensioned to receive the outer filter 200, as illustrated in the drawings.

A hub or boss 82 is centrally disposed within cup-shaped portion 42. Hub 82 is formed on the upper surface of bottom wall 52. Hub 82 is generally cylindrical in shape and includes a section 84 of reduced diameter at the upper end thereof. Reduced-diameter section 84 defines a stepped or notched area 86 at the upper end of hub 82. Hub 82 has a cylindrical outer surface 82a and a conical inner surface 82b. An annular channel or trough 92 is formed between outer surface 82a of hub 82 and inner surface 54b of cylindrical side wall 54. Conical inner surface 82b of hub 82 defines a conical opening or passageway 88 that extends through bottom wall 52 and communicates with cylindrical passage 58 formed in tubular stack portion 44.

A recess or cavity 94 is formed in outer surface 82a of hub 82 near the bottom wall 52 of the cup-shaped portion 42, as best seen in FIG. 2.

Two spaced-apart openings 112, 114 are formed through hub 82 to connect channel 92 with the inner conical surface 82b of hub 82. In the embodiment shown, openings 112, 114 extend generally horizontally through hub 82, with opening 112 being disposed above the opening 114. Upper opening 112 is dimensioned to receive a valve element 120. Lower opening 114 is disposed to communicate with a low region of channel 92.

In the embodiment shown, valve element 120 is an umbrella valve formed of a resilient polymer or elastomeric material. Valve element 120 has a circular portion 122 dimensioned to be disposed within conical passageway 88 defined by the inner conical surface 82b of hub 82 and to overlay or cover opening 114, as best seen in FIG. 4. Valve element 120 further includes stem portion 124 that extends from circular portion 122 of valve element 120. Stem portion 124 includes a collar or enlarged area 126, as shown in the drawings. In this respect, hub 82 and opening 112 are dimensioned such that stem portion 124 can extend through opening 112 with enlarged portion 126 of stem portion 124 abutting the end wall defined by cavity 94.

In a preferred embodiment, valve element 120 is an umbrella valve sold under Part No. UM18.0001-152.01 by Minivalve Inc. of Cleveland, Ohio.

As best seen in FIG. 4, when positioned within opening 112, circular portion 122 of valve element 120 covers opening 114, where opening 114 communicates with conical passageway 88 defined by inner surface 82b of hub 82. A threaded opening 132 is formed in thick section 54a of side wall 54 of cup-shaped portion 42 of base 40. Threaded opening 132 is generally in registry, i.e., alignment, with cavity 94 in hub 82. Threaded opening 132 is dimensioned to receive a conventional threaded plug 134, as illustrated in FIG. 4.

Figure 3:
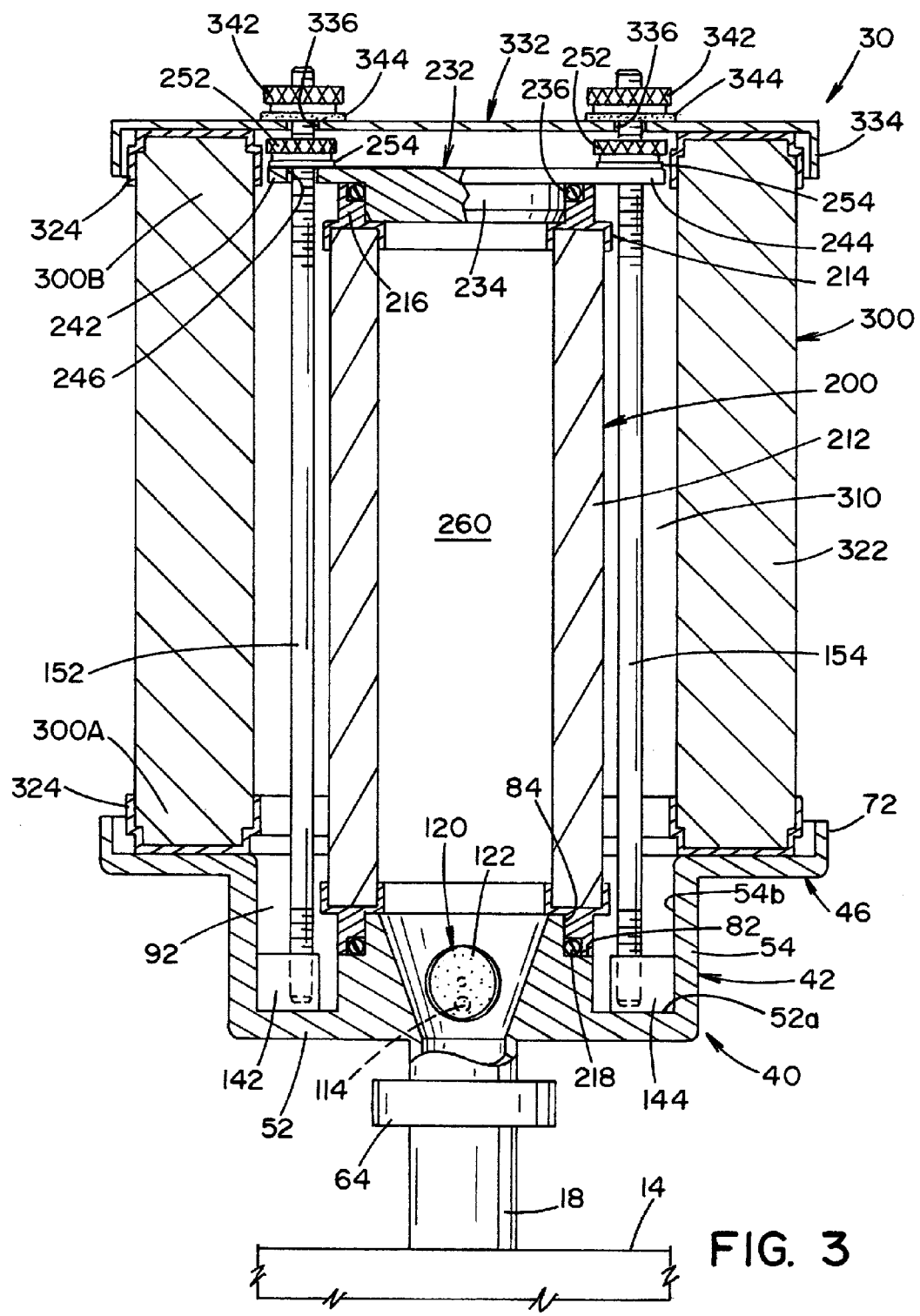
FIG. 3 is a second sectional view of the filter assembly shown in FIG. 1 taken 90° from the section shown in FIG. 2.

Two spaced-apart blocks or supports 142, 144 are formed within the cup-shaped portion 42, as best seen in FIG. 3. Blocks or supports 142, 144 extend from inner surface 52a of bottom wall 52 and from inner surface 54b of side wall 54. Blocks 142, 144 are disposed on opposite sides of hub 82. Threaded bores are formed into blocks 142, 144 to receive elongated threaded rods 152, 154 that extend upwardly from base 40, as shown in the drawings. The ends of rods 142, 144 are threaded, as shall be explained in greater detail below.

Inner filter 200 is an elongated tubular member. In the embodiment shown, inner filter 200 is cylindrical in shape and is comprised of a tubular filter member 212 and annular collars or rings 214 on the ends of tubular filter member 212. One side of each collar 214 defines an annular slot dimensioned to receive an end of tubular filter member 212. The other side of collar 214 is in the shape of a cylindrical wall 216. Wall 216 of collar 214 is dimensioned to receive reduced-diameter section 84 of hub 82. Wall portion 216 of collar 214 includes a recessed corner dimensioned to receive an O-ring 218 which seals collar 214 of inner filter 200 against hub 82, as best seen in FIG. 3. Inner filter 200 has a first end 200A and a second end 200B. First end 200A is connected to hub 82 of base 40, with second end 200B positioned thereabove. A cap 232 is dimensioned to be placed upon second end 200B of inner filter 200. Cap 232 includes a centrally located cylindrical portion 234 dimensioned to be received within wall 216 of collar 214 on second end 200B of inner filter 200. O-ring 236 is disposed between cylindrical portion 234 of cap 232 and wall 216 of collar 214 on inner filter 200. Cap 232 includes outward-extending wings 242, 244 on opposite sides of cap 232. An aperture 246 is formed in each wing 242, 244. Apertures 246 are dimensioned and positioned to receive the threaded ends of elongated rods 152, 154 therethrough. Knurled fastening elements 252 are threaded onto the ends of elongated rods 152, 154 with washers 254 to secure cap 232 onto second end 200B of inner filter 200 and to compress and secure inner filter 200 onto base 40.

Outer filter 300 is dimensioned to be disposed upon flange portion 46 of base 40. As illustrated in the drawings, outer filter 300 is spaced from inner filter 200 to define an annular chamber 310 between inner filter 200 and outer filter 300. In the embodiment shown, outer filter 300 is cylindrical in shape and includes a filter element 322. End caps 324 are provided on each end of filter element 322. One end 300A of outer filter 300 is dimensioned to rest upon upward-facing annular surface 46a of flange portion 46 of base 40. A cover 332, that is circular in shape, is dimensioned to be placed over second end 300B of outer filter 300. Cover 332 includes a downward-extending lip or wall 334 to capture the end of outer filter 300. Cover 332 further includes spaced-apart apertures 336 dimensioned and disposed to receive the ends of threaded rods 152, 154 therethrough. Knurled fasteners 342 are screwed onto the ends of threaded rods 152, 154 to secure cover 332 onto outer filter 300, thereby securing outer filter 300 to base 40. Gaskets 344 are disposed between fasteners 342 and cover 332 to form a seal therebetween.

As shown in the drawings, inner filter 200 defines a cylindrical inner chamber 260 that communicates with conical passageway 88 through hub 82, cylindrical passageway 58 through stack portion 44 of base 40, and cylindrical opening 68 to outlet conduit 18 of vacuum pump 14.

In a preferred embodiment, inner filter 200 is comprised of a filter sold under Catalog No. 112453 by Alcatel Vacuum Products Inc. of Hingham, Mass.

Outer filter 300 is generally comprised of an activated carbon to remove odors from air passing therethrough. In a preferred embodiment, outer filter 300 is a filter sold under Part No. 3167-EL-02-SD 18483 by Solberg Manufacturing Inc. of Itasca, Ill.

Referring now to the operation of filter assembly 30, as best seen in FIG. 4, filter assembly 30 is attached to outlet conduit 18 of vacuum pump 14 by a collar clamp 64. In this respect, filter assembly 30 is disposed in a generally vertical orientation, wherein the axes of inner and outer filters 200, 300 are generally vertical. During operation of vacuum pump 14, an airstream, under pressure, i.e., the output of vacuum pump 14, flows into inner chamber 260 of inner filter 200. Oil and other material within the airstream that are pumped from the sterilization chamber are filtered by inner filter 200 and mostly confined within inner chamber 260 defined by inner filter 200. Filtered air, passing through inner filter 200, enters annular chamber 310 defined between inner filter 200 and outer filter 300. Oil separated by inner filter 200 remains within inner chamber 260 as illustrated by the drops "D" shown in FIG. 4. In this respect, the majority of the oil mist within the airstream created by vacuum pump 14 is retained within inner chamber 260 of filter assembly 30. As illustrated in FIG. 4, some oil may penetrate through inner filter 200 and collect on the outer surface of inner filter 200. Oil drops "D," that would typically collect along the outer surface of inner filter 200, flow by gravity to annular channel 92 formed in base 40, as illustrated in FIG. 4.

Air filtered by inner filter 200 would be forced into outer annular chamber 310 to outer filter 300. As indicted above, outer filter 300 is preferably formed of a charcoal material or another similar material which would remove odors from the airstream. The filtered air would then be released to the surrounding environment, after having been filtered by inner filter 200 and outer filter 300.

During operation of vacuum pump 14, pressure exists within inner chamber 260 defined by inner filter 200 and the outer annular chamber 310 defined by outer filter 300. As will be appreciated, the pressure within inner filter 200 is greater than the pressure in outer annular chamber 310. As a result, the pressure within inner chamber 260 keeps circular portion 122 of valve element 120 pressed against inner surface 82b of hub 82, thereby covering and sealing opening 114 formed through the side wall of hub 82. This insures that the airstream created by vacuum pump 14 must flow through the filter media of inner filter 200 before reaching outer annular chamber 310 of filter assembly 30.

Oil filtered from the airstream by inner filter 200 will flow along the inner surface of inner filter 200 down into the funnel-shaped passageway 88 in base 40 and be returned to vacuum pump 14 through passageway 58 in outlet conduit 18. As will be appreciated, most oil mist in the airstream will be filtered by inner filter 200. However, as indicated above, some oil will be forced through, i.e., penetrate through, inner filter 200 and will form into drops "D" along the outer surface of inner filter 200 in annular chamber 310. Oil drops "D" will drain down and form a pool "P" of oil in annular channel 92, as illustrated in FIG. 4.

During periods when vacuum pump 14 is not operating, any oil collected within annular channel 92 in base 40 is allowed to flow back into passageway 88 of base 40 by means of gravity when the pressure of the oil in annular channel 92 is greater than the pressure in passageway 88. In other words, oil collected in annular chamber 310 is allowed to drain back into vacuum pump 14 through inner chamber 260, when the pressure in annular chamber 310 exceeds the pressure in inner chamber 260.

The present invention, thus, provides compact filter assembly for removing oil mist and odor from a vacuum pump. The present invention further provides a filter assembly that is easy to maintain and clean.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A device for removing oil mist and odors from an airstream, comprising:
    a base having an air inlet in the lower end thereof for receiving an airstream and a channel formed around said air inlet opening;
    a first tubular filter having a first end and a second end, said first end mounted on said base wherein said first tubular filter defines an inner chamber that is in communication with said air inlet and wherein said first filter is dimensioned to filter oil from said airstream;
    a second tubular filter having a first end and a second end, said first end mounted on said base, said second tubular filter surrounding said first tubular filter and defining an outer chamber therebetween that communicates with said channel in said base, said second tubular filter being disposed downstream of said first tubular filter;
    an opening through said base, said opening connecting said outer chamber with said air inlet;
    a valve element disposed in said opening of said base, said valve element allowing flow from said outer chamber, through said opening and to said air inlet when pressure in said outer chamber exceeds pressure in said air inlet;
    a cap secured on said second end of said first tubular filter to close said second end; and
    a cover secured on said second end of said second tubular filter to close said second end; at least two rods each extending through said outer chamber, each of said at least two rods having a first end secured to said base and a second end; and a plurality of fastening elements disposed on each of said at least two rods near second end thereof for clamping said first tubular filter between said base and said cap and for clamping said second tubular filter between said base and said cover.

2. A device for removing oil mist and odors from an airstream as described in claim 1 wherein said first and second filters are concentrically mounted to said base to be symmetrical about an axis through said base.

3. A device for removing oil mist and odors from an airstream as described in claim 1 wherein said second filter is dimensioned to filter odor from said airstream.

4. A device for removing oil mist and odors from an airstream as described in claim 1 wherein said opening through said base communicates with said channel in said base.

5. A device for removing oil mist and odors from an airstream as described in claim 4 wherein said opening in said base communicates with a low area in said channel.

6. A device for removing oil mist and odors from an airstream as described in claim 1 wherein said valve is an umbrella valve.

7. A device for removing oil mist and odors from an airstream as described in claim 6 wherein said umbrella valve is formed of an elastomeric material.

8. A device for removing oil mist and odors from an airstream as described in claim 6 wherein said umbrella valve includes a cylindrical disk portion, said disk portion covering said opening in said base.

9. A device for removing oil mist and odors from an airstream as described in claim 8 wherein said disk portion is disposed in said inlet in said base.

\* \* \* \* \*